Oct. 29, 1963        J. H. RAMSEY ETAL        3,108,321
                CONTINUOUS VULCANIZING APPARATUS
Filed Dec. 3, 1962                            5 Sheets-Sheet 1
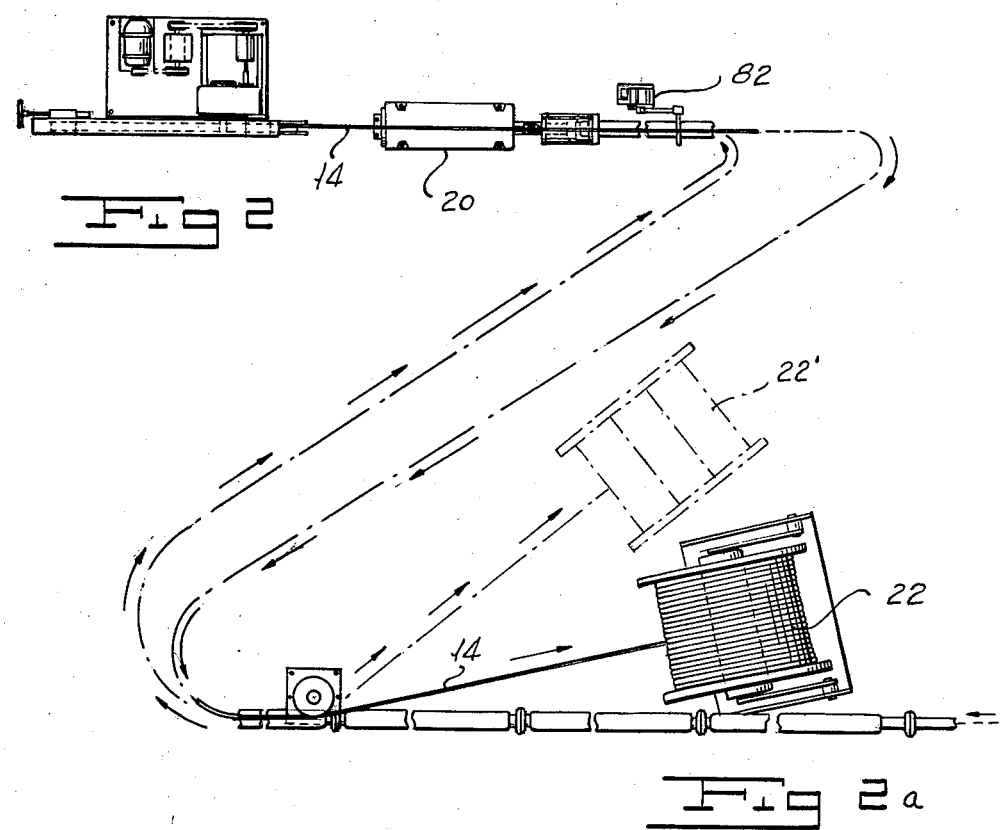
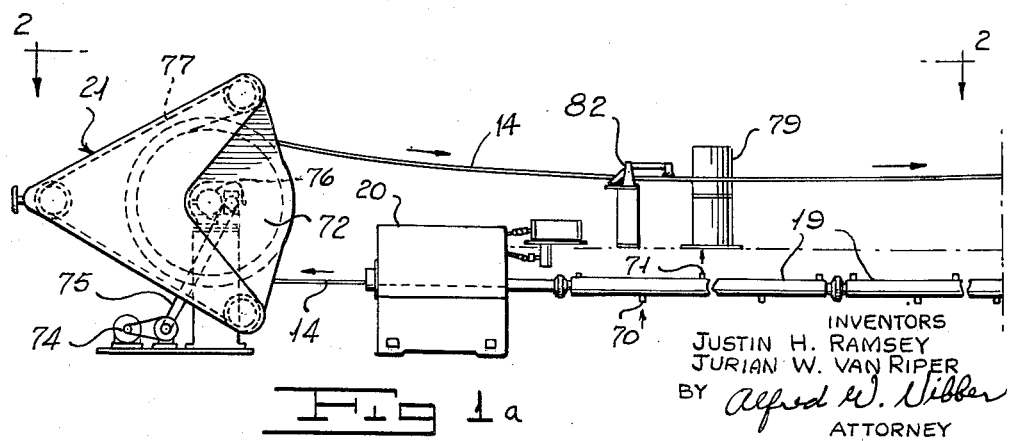
INVENTORS
JUSTIN H. RAMSEY
JURIAN W. VAN RIPER
BY
ATTORNEY Oct. 29, 1963 J. H. RAMSEY ETAL 3,108,321
CONTINUOUS VULCANIZING APPARATUS
Filed Dec. 3, 1962 5 Sheets-Sheet 2
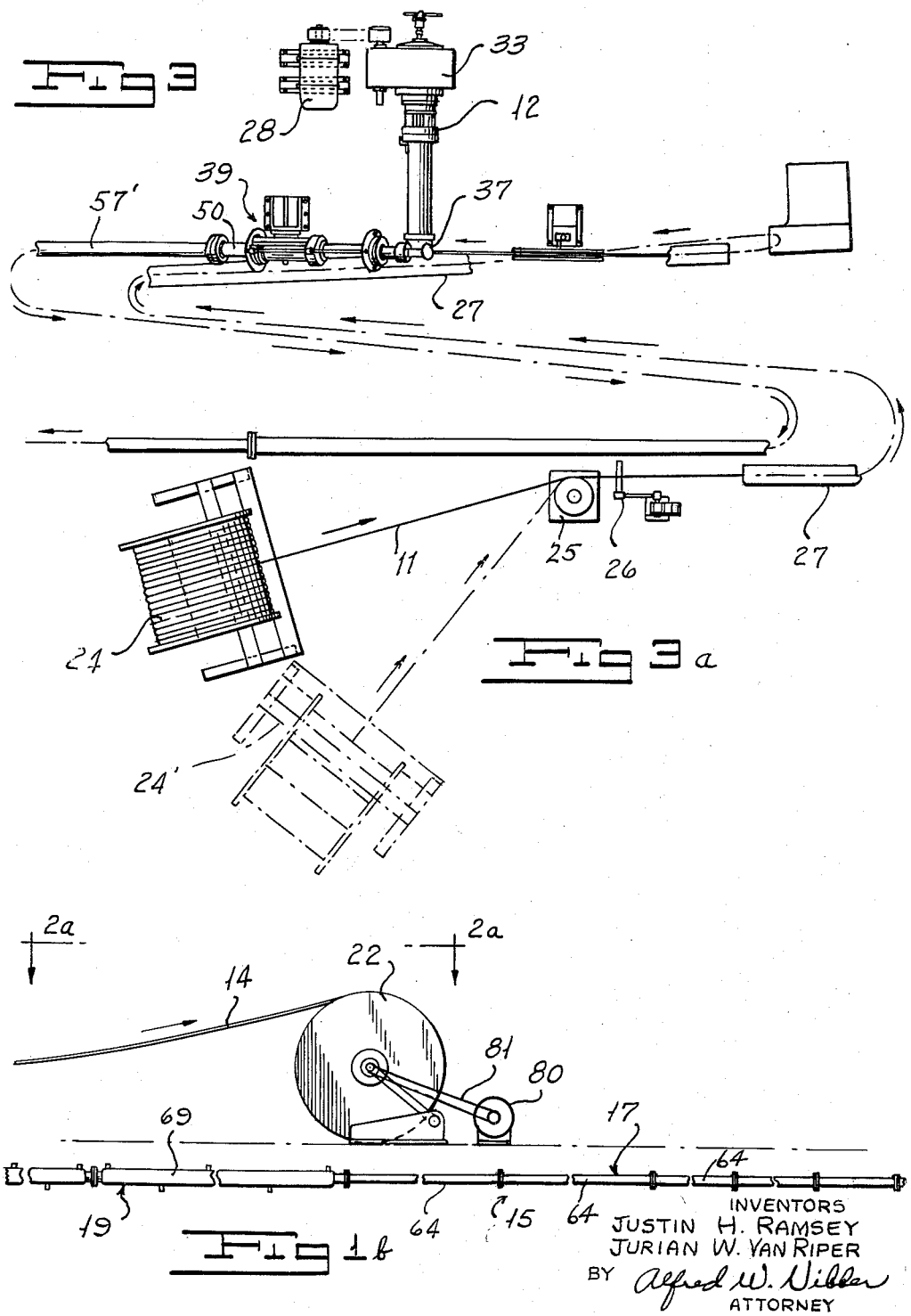
INVENTORS
JUSTIN H. RAMSEY
JURIAN W. VAN RIPER
BY Alfred W. Nibber
ATTORNEY

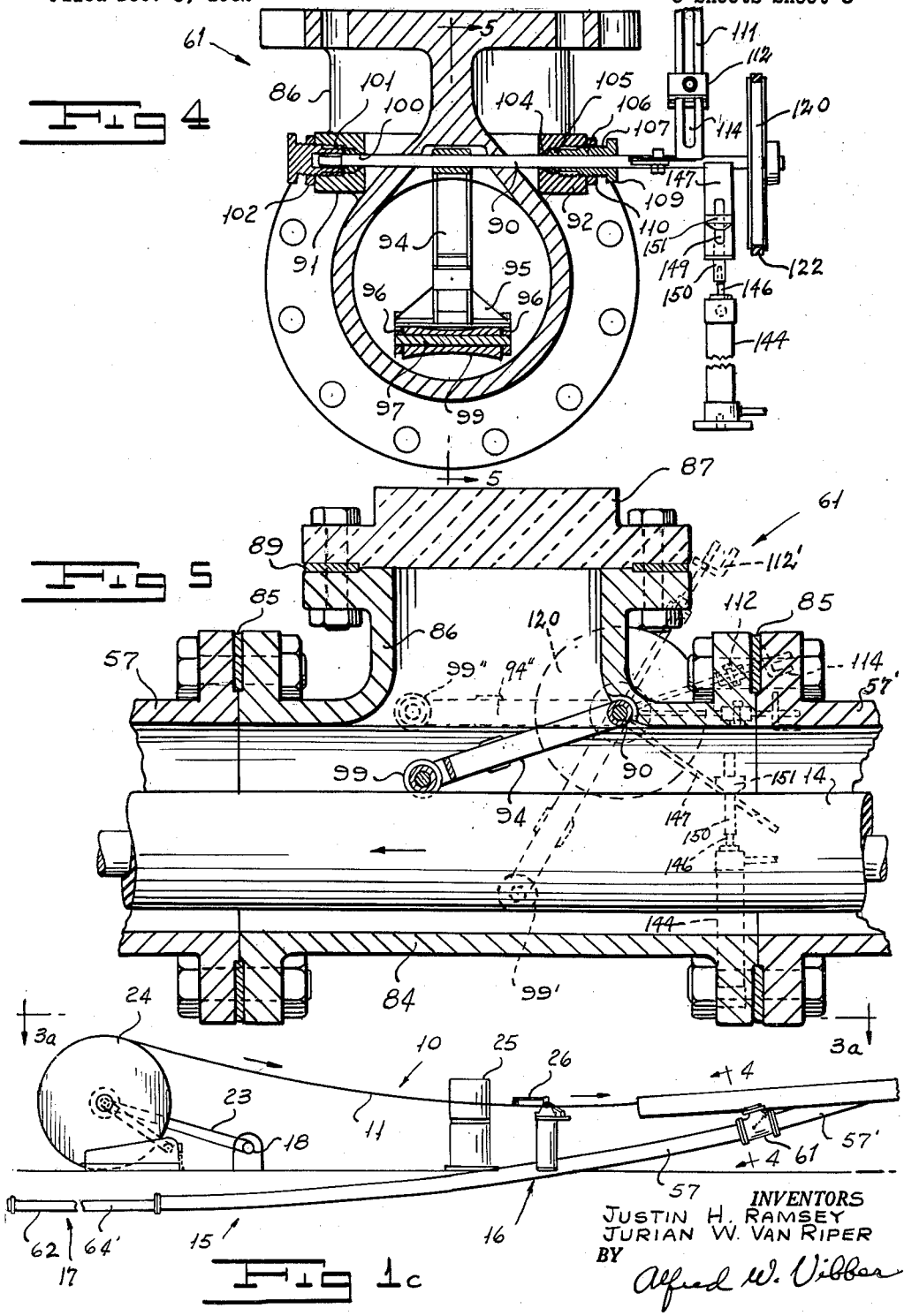

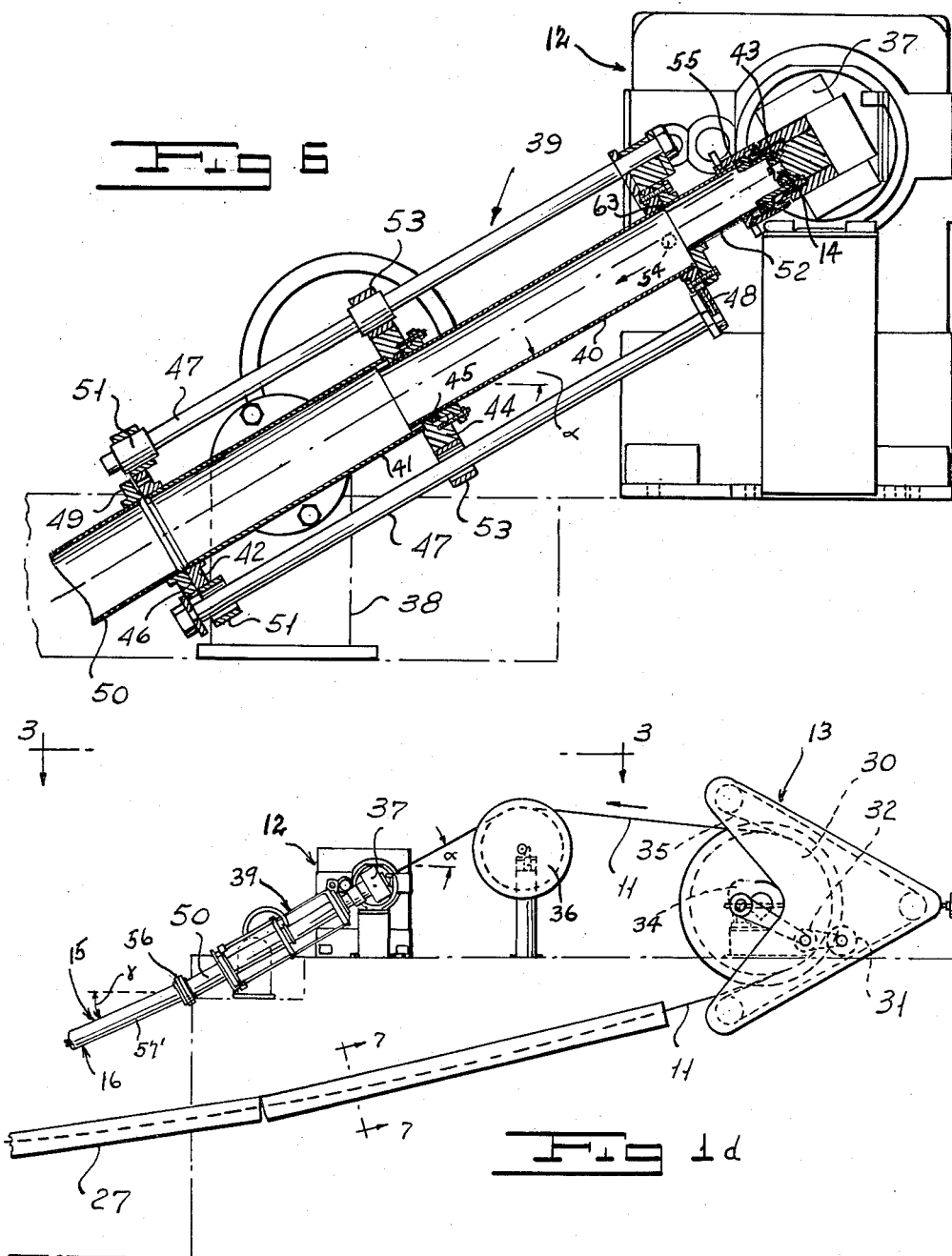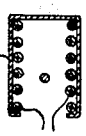

Oct. 29, 1963 J. H. RAMSEY ETAL 3,108,321
CONTINUOUS VULCANIZING APPARATUS
Filed Dec. 3, 1962 5 Sheets-Sheet 5
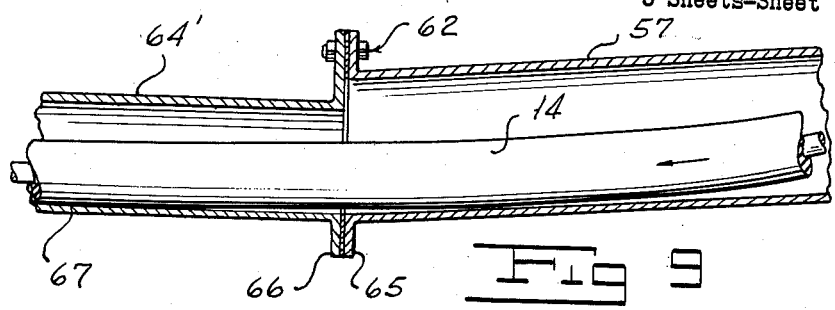
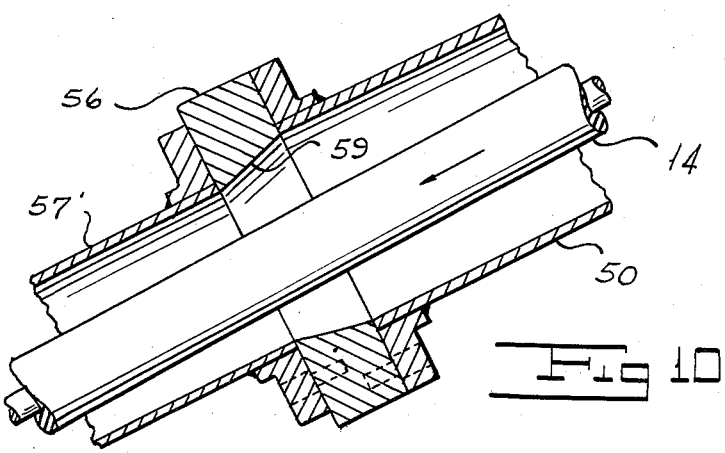
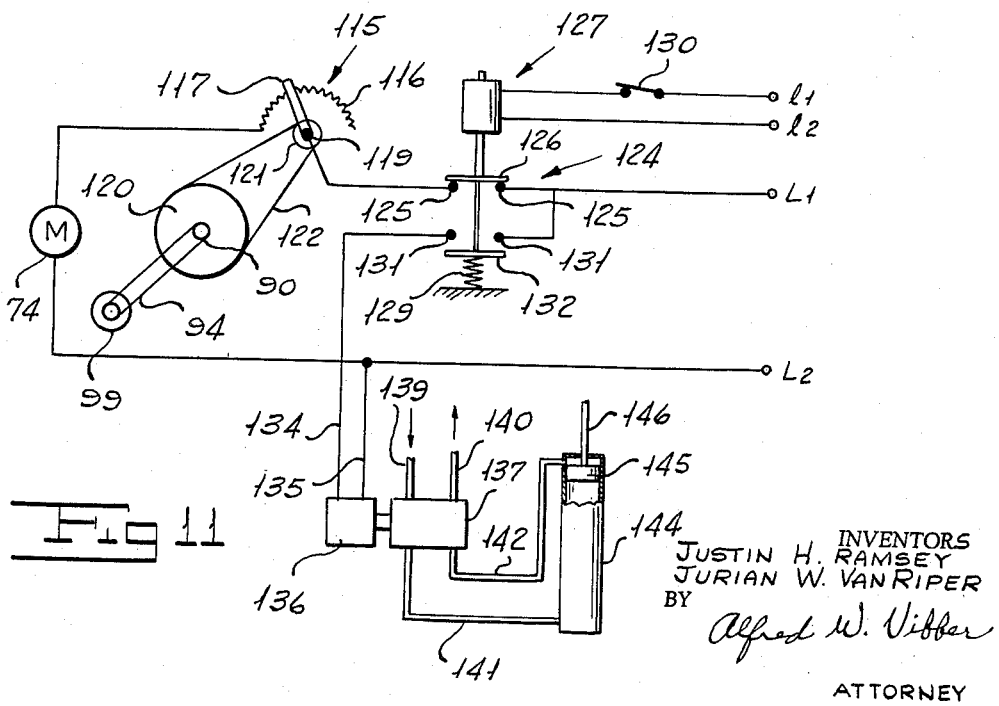
INVENTORS
JUSTIN H. RAMSEY
JURIAN W. VAN RIPER
BY
Alfred W. Vibber
ATTORNEY

3,108,321
CONTINUOUS VULCANIZING APPARATUS
Justin H. Ramsey, R.F.D. 1, Ramsey, N.J., and Jurian W. Van Riper, 208 Beechwood Road, Ridgewood, N.J.
Filed Dec. 3, 1962, Ser. No. 241,671
15 Claims. (Cl. 18—6)

This invention relates to apparatus for continuously vulcanizing elongated vulcanizable material.

Elongated vulcanizable material, such as cables sheathed with vulcanizable rubber or rubber-like materials, are conventionally vulcanized by being introduced into an elongated chamber filled with steam at high pressure and temperature. The material is pulled through such chamber and, after it has become vulcanized, is then introduced into a cooling chamber which may form a prolongation of the vulcanizing chamber. The vulcanized and somewhat cooled material is then withdrawn from the cooling chamber and is taken up and stored, for example, on a take-up reel.

By far the greater number of continuous vulcanizing systems of the type described have the vulcanizing chamber and cooling chambers disposed horizontally so that they are accessible for maintenance, stringing-up, etc., when required. Usually the head of the extruding machine which applies the rubber or rubber-like material to the cable is disposed at the entering end of the vulcanizing chamber, the die of such head and the plastic material extruded therethrough forming a seal at the entering end of the vulcanizing chamber. Although, as stated, such systems are readily accessible, they present inherent difficulties, particularly when employed in the sheathing and vulcanizing of heavy cables, because of damage to the lower part of the sheath of the cable as it rubs upon the inner surface of the vulcanizing chamber in the first or entering portion of such chamber, such damage being most severe when the plastic material is in a "tender" substantially unvulcanized state.

To overcome such damage to the extruded plastic material, it has been proposed to dispose the vulcanizing chamber vertically. This, however, entails the use of either a deep pit or a tall tower, since the vulcanizing chamber must have a length of at least 100 feet to be at all economically feasible. Not only are such pits or towers expensive to make, but the vertically disposed continuous vulcanizing apparatus is difficult of access for maintenance. As a result, the horizontal continuous vulcanizing systems far outnumber the vertically disposed systems.

The continuous vulcanizing system of the present invention preserves substantially the advantages of both the horizontal and vertical continuous vulcanizing systems. Briefly, the vulcanizing system of the present invention employs a vulcanizing chamber wherein the first or entering portion is substantially in the form of a half-catenary wherein the material to be vulcanized enters the upper end of the catenary and progresses downwardly in generally catenary form until it reaches a zone wherein it lies substantially tangential to the horizontal. From such first horizontal zone the vulcanizing chamber continues in a further horizontal run of substantial extent, the vulcanized material continuing to travel horizontally through a cooling zone disposed generally as a prolongation of the vulcanizing chamber. The continuous vulcanizing system of the present invention includes not only the above-described novel configuration of the entering end of the vulcanizing chamber, but also includes a novel system for maintaining the position of the elongated material within the vulcanizing chamber such that the material remains substantially free from contact with the walls of the chamber in the first or entering portion of the chamber.

It has been found that with the disclosed half-catenary end of the vulcanizing chamber of the invention it is a virtual necessity that the apparatus be provided with a material position-sensing device if the apparatus is to function in the intended manner, that is, to maintain the material free from contact with any fixed object until it has been at least preliminarily vulcanized. The relative dimensions of the diameter of the vulcanizing chamber and of the material passing therethrough are such that even a small difference of speed of the hold-back and take-up capstans for a relatively short time, if uncorrected, would result in the dragging of the material against the upper or lower surfaces of the chamber, thereby defeating the effectiveness and purpose of the half-catenary system. It would not be feasible economically to employ an operator constantly to watch the position of the material within the vulcanizing chamber, as through a sight glass, and to govern the motor of the hold-back or take-up capstan accordingly. The material position-detecting and controlling mechanism of the present invention permit the apparatus to be run for long periods free from the attention of an operator in this regard with the assurance that the material being vulcanized will not contact any fixed object in the span from the entering end of the half-catenary to the lower end thereof.

The invention has among its objects the provision of a generally horizontal continuous vulcanizing apparatus which substantially eliminates the scuffing of elongated material being vulcanized in the apparatus.

A further object of the invention lies in the provision of continuous vulcanizing apparatus of the type indicated in which contact between elongated material being vulcanized therein and any fixed structure in the vulcanizing chamber is eliminated in the early vulcanizing stages of the material.

A still further object of the invention lies in the provision of a vulcanizing chamber of novel contour at the entering end thereof.

Yet another object of the invention lies in the combination of such vulcanizing chamber of novel contour and means at the entering end of the vulcanizing chamber which permits the entry of the elongated material thereinto so that it lies in generally catenary form free from contact with any fixed object.

Still another object of the invention lies in the provision of a novel position-sensing device located internally of the vulcanizing chamber for cooperation with the material being vulcanized, and of the combination of such position-sensing device and the vulcanizing chamber of novel contour of the invention.

A further object of the invention lies in the provision, in combination with the position-sensing device, of mechanism automatically to retract the material-engaging element of such device from the path of travel of the material through the vulcanizing chamber upon the stopping of the travel of the material through such chamber.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts through the several views, FIGS. 1a, 1b, 1c, and 1d taken together as indicated in FIG. 8 form a somewhat schematic view in side elevation of a preferred embodiment of continuous vulcanizing apparatus in accordance with the invention, the apparatus as illustrated being shortened somewhat by breaking through zones of the vulcanizing and cooling chambers thereof;

FIG. 2 is a fragmentary foreshortened view in plan of a portion of the vulcanizing apparatus, the view being taken from line 2—2 of FIG. 1a;

FIG. 2a is a fragmentary foreshortened view in plan of another portion of the apparatus, the view being taken from the line 2a—2a of FIG. 1b;

FIG. 3 is a fragmentary foreshortened view in plan of a further portion of the apparatus, the view being taken from the line 3—3 of FIG. 1d;

FIG. 3a is a fragmentary foreshortened view in plan of a still further portion of the apparatus, the view being taken from line 3a—3a of FIG. 1c;

FIGS. 2, 2a, 3 and 3a form a composite somewhat diagrammatic view in plan of the continuous vulcanizing apparatus of FIGS. 1a—1d;

FIG. 4 is a view in cross section through the illustrative vulcanizing apparatus in the vicinity of an internal position-sensing device cooperating with the material in the vulcanizing chamber, the section being taken along the line 4—4 of FIG. 1c;

FIG. 5 is a view in longitudinal section through the apparatus at the location of the position-sensing device, the section being taken along the line 5—5 of FIG. 4;

FIG. 6 is a fragmentary view in longitudinal axial section through the splice box which is positioned at the entering end of the entering portion of the vulcanizing chamber, the lower half of the section, through the flanges at the ends of bar or tie rods 47 only, being taken at right angles with respect to the plane of the general section;

FIG. 7 is a view in cross section through the preheater for the unsheathed core being sheathed and vulcanized by the apparatus of the invention, the section being taken along the line 7—7 of FIG. 1d;

FIG. 8 is a diagram showing the manner of assembly of the first 4 sheets of the drawing to form the two composite figures first described above;

FIG. 9 is an enlarged view in vertical axial section through the zone of the vulcanizing chamber wherein the lower exit end of the curved entering portion merges with the subsequent straight horizontal portion thereof;

FIG. 10 is an enlarged fragmentary view in longitudinal vertical section through the zone of connection between the lower end of the straight splice box section and the upper end of the curved section of the entering portion of the vulcanizing chamber; and FIG. 11 is a schematic view showing the material-position detecting and controlling system for the illustrated continuous vulcanizing apparatus.

First considering the composite FIG. 1a—1d, the illustrative continuous vulcanizing apparatus in accordance with the invention, which is shown employed to vulcanize an extruded sheath on a wire core, includes a section 10 (FIGS. 1c and 1d) for the paying off and tension control of the unsheathed wire core 11. In section 10 the wire core 11 travels to the right until it passes around a belt wrap hold-back capstan 13. From such capstan the core travels into the head of a plastic material extruder 12 from which it emerges into the vulcanizing section (FIGS. 1b, 1c, and 1d), generally designated 15, of a continuous vulcanizing apparatus. Section 15 is made up of a generally curved entering section 16 (FIGS. 1c and 1d), the lower portion of which is in the form of a half-catenary, and of a subsequent straight horizontal section 17 (FIGS. 1b and 1c).

The elongated material 14, in which the core 11 is now covered by an extruded sheath, travels to the left through vulcanizing section 15 and thence into a cooling zone 19 which is disposed in alignment with the vulcanizing zone. The left hand end of the cooling zone is provided with a seal 20 from which the sheathed vulcanized and at least partially cooled material 14 issues. Seal 20 prevents the escape of steam and water from the cooling zone. Such material 14 is then engaged by a belt-wrap pull-out capstan 21 (FIG. 1a) which diverts the material and forwards it to the right to a take-up reel 22.

Turning to FIGS. 1c and 1d, it will be seen that in the pay-off section 10 the unsheathed wire core 11 is payed off a supply reel 24 which is driven at an appropriate speed by a motor 18 through a drive train generally designated 23. Core 11 travels to the right past a diverting and guiding drum 25 and thence past a first dancer roll device 26 which controls the tension in core 11 in the span thereof extending from reel 24 to the hold-back capstan 13.

In that portion of such span lying adjacent the hold-back capstan, the core runs through an open-bottomed oven or preheater 27 which is provided with a plurality of steam heating pipes 29 on its inner side surfaces. Upon emerging from the preheater 27 the core 11 runs around the drum 30 of the hold-back capstan 13. The hold-back capstan includes an electric motor 31 which drives the drum 30 by means of a drive train 32 and a gear box 34. A belt 35 is entrained over guide pulleys mounted in a suitable frame device so that a portion of the belt overlies the core 11 as it travels around drum 30. The hold-back tension exerted on core 11 to retard its travel through the vulcanizing and cooling zones may be varied by varying the degree of energization and thus the speed for motor 31.

From the hold-back capstan 13 the core 11 travels to the left over a guide sheave 36 and thence at an angle $\alpha$ with respect to the horizontal downwardly into the sheathing head 37 of a plastic material extruding machine 12. As it leaves die 43 of the sheathing head 37, the now-sheathed core 11, that is, elongated material 14, travels downwardly into an inclined straight hollow adapter sleeve 52 and into and through an inclined straight splice box 39. The splice box shown is of the telescoping-section type, and thus must be straight. The splice box section somewhat exceeds in diameter the diameter of the adapter sleeve 52 and of subsequent sections 57' and 57 of the entering portion of the vulcanizing chamber, to insure that material 14 will not contact any surfaces of the splice box.

Splice box 39, which is somewhat generally shown and described herein, is the subject of application Serial No. 256,795, filed January 14, 1963, by Justin H. Ramsey. Such splice box permits the opening of the vulcanizing chamber, when the chamber is relieved of steam pressure, to permit the splicing of the entering end of a new length of elongated material 14 to the trailing end of a previous length of such material which has been sheathed.

Splice box 39, which is supported on a frame 38, has a first, upper slidable conduit section 40 which is disposed at an angle $\alpha$ with respect to the horizontal. Secured to the upper end of conduit 40 at a joint generally designated 63 is an adaptor tube 52, the upper end of which is received within a sleeve portion at the delivery end of the extrusion head 37 so as to be sealed thereto. Such sealing connection between the head and adaptor tube 52 is effected by a threaded sleeve 55 functioning as a removable nut to retain adaptor 52 in the head. When it is desired to open the upper end of the vulcanizing chamber, to make a splice between the trailing end of one length of material and the entering end of a new length of material which has passed through the head 37 into the splice box, the nut 55 is removed and conduit portion 40 and adaptor 52 are slid downwardly to the left thereby to provide an open section of appreciable length in the chamber at which such splice may be made.

The lower end of conduit portion 40 is telescopically received within a fixed conduit portion 41 of larger diameter. Conduit portion 41 is fixedly supported in two flange-like members 44 and 42 affixed thereto at its upper and lower ends, respectively. The flange-like members, in turn, are secured to fixed frame 38. Sealing between conduit sections 40 and 41 is effected by a single ring-like gland 45 which is secured to flange structure 44.

Gland 45 may be made, for example, of a high temperature-resistant low friction material such as Teflon (polytetrafluoroethylene). As disclosed more clearly in the above-referred-to Ramsey application, conduit section 40 is supported at its upper end, and guided in its travel between open and closed position by an external reciprocable open frame work made up as follows: Two diametrically opposed guide or tie rods 47, disposed parallel to the axis of conduit section 40, have their upper ends secured to a flange member 48 adjacent joint 63. Rods 47 extend through guide means 53 on flange 44 and guide means 51 on flange 42, the lower ends of rods 47 being connected together by a ring-like member 49. Connection between the flange 48 and the upper end of conduit section 40 is effected by two oppositely disposed radially inwardly extending oppositely disposed radially inwardly extending pins diagrammatically shown at 54, which permit the conduit 40 to bow longitudinally in a vertical plane which such conduit section is subjected, as during the first introduction of steam into the vulcanizing chamber, to uneven temperatures at its bottom and upper portions.

When the conduit 40 is retracted into its open, downward position, the outer open framework consisting of flange 48, the connecting member 49, and tie rods 47 travel therewith. The sealing gland 45, which, in effect, engages the outer surface of conduit section 40 at one annular zone only, will yield sufficiently without damage thereto to permit the at least slightly bowed conduit section 40 to pass therethrough. It is preferred, because of the weight of conduit section 40 and of the parts making up the outer open framework associated therewith to provide power means for raising and lowering conduit section 40 in its outer framework. Such power means may, for example, take the form of fluid operated reciprocable motors acting between a part of the outer framework and a fixed part of the apparatus. Such power means is shown, described, and claimed in the above-referred-to Ramsey application. For simplicity, however, such power means is not shown here.

Vulcanizing steam at high pressure and temperature is introduced into the vulcanizing chamber through a means (not shown) in the vicinity of the splice box 39. When it is desired to open the vulcanizing chamber, the supply of vulcanizing steam is shut off and the chamber is then opened by a sliding conduit section 40 downwardly so that it lies telescoped within section 41.

At the lower end of conduit section 50 the entering end of the vulcanizing chamber begins to curve in a direction from right to left, the curve being generally in the shape of a half-catenary. Since the portions 57' and 57 of the curved vulcanizing chamber portion generally approximate the catenary in which the material lies, such sections may be made with a diameter somewhat less than that of splice box 39 and conduit section 50. As shown in FIG. 10, a joint 56 is provided between the lower end of conduit section 50 and the upper end of section 57', joint 56 having an annular internal surface 59 which curves smoothly from the inner surface of conduit 50 to that of conduit 57. The upper end of conduit 57' is shown in FIG. 1d as lying at an angle γ with respect to the horizontal. An internal dancer roll device 61 is disposed below conduit section 50 and in a first curved conduit section 57'. A still further curved conduit section 57 extends downwardly from the housing of device 61 to a zone 62, the vulcanizing chamber at the latter zone lying substantially horizontal.

Because the vulcanizing chamber to the left of zone 62 lies straight and horizontal, it and the cooling zone therebeyond may be constituted by conduit sections of smaller diameter than that of section 57. In FIG. 9 there is shown the relationship between conduit section 57 and the subsequent or first straight conduit section 64' of the vulcanizing chamber. Conduit section 57 may, for example, have an internal diameter of 8". Conduit section 64', for example, may have an internal diameter of 6". Such two conduit sections are joined by flanges 65 and 66 so that the lower inner surfaces of the conduit sections merge smoothly. As shown in FIG. 9, the span of the sheathed material 14 in the entering portion of the vulcanizing chamber is maintained of such configuration that the lower surface of material 14 first contacts the lower inner surface of the chamber at a horizontal zone 67 therein. By the time thaat the sheathed material has reached zone 67 the sheath thereon will have been vulcanized to such an extent that it may safely carry the weight of the material without damage to the sheath. Beyond zone 67, the sheathed material 14, now supported by the inner bottom surface of the vulcanizing chamber, travels through successive sections 64 of the latter and into a cooling zone disposed in alignment with the exit end. The cooling zone has an inner conduit about which there are disposed cooling jackets 69 into which cooling water may be introduced through pipes such as shown at 70 and may be exhausted therefrom through pipes such as shown at 71.

Upon issuing from the cooling zone and from the seal assembly 20 the vulcanized sheathed material 14 passes around the pull-out capstan 21. Such capstan, which is of generally the same construction as the hold-back capstan 13, has a drum 72 driven by a variable speed electric motor 74 through a drive train 75 and a gear set 76. A belt 77 which is entrained partially about drum 72 overlies the material 14 as it travels around the drum. From the pull-out capstan 21 material 14 travels to the right through a dancer roll control device 82 and past a vertical guiding and diverting drum 79. The material 14 then travels to the take-up reel 22 which is driven by a variable speed electric motor 80 through a drive train 81.

In controlling the described continuous vulcanizing system, the speed of electric motor 31 driving the holdback capstan 13 is synchronized with the speed of motor 28 which drives the extruder 12 through the drive train and gearing system 33 (FIG. 3). The tension in the span of the unsheathed core 11, from pay-off reel 24 to holdback capstan 13, and thus the configuration of such span, are controlled by the dancer control device 26 which controls the speed of electric motor 18 driving the pay-off reel 24. The tension in the span of sheathed material 14 from the pull-out capstan 21 to the take-up reel 22 is controlled by the dancer roll device 82 which controls the speed of motor 80.

The tension in the span of material 14 from the sheathing head 37 to the zone 67 (FIG. 9), and thus the configuration of such span, are under the control of the internal dancer roll device 61, such device controlling the speed of electric motor 74 of the pull-out capstan 21. The dancer roll device 61 functions with motor 74 to maintain the described span of material under such tension at all times that the material lies free from contact with any fixed surface within the entering end of the vulcanizing zone from the head 37 to the zone 67. The construction of dancer roll device 61 is more readily apparent in FIGS. 4 and 5.

As there shown, the device 61 has a housing 84 in the form of a conduit T, the straight portion of the T being disposed between and sealed to successive curved conduit portions 57', 57 by joints 85. The hollow boss portion 86 of housing 84 is disposed vertically and is closed by a thick sight glass 87 bolted and sealed thereto as shown at 89.

At the entering lower edge of boss 86 there are disposed two horizontally aligned journal-forming bosses 91 and 92. Bosses 91 and 92 support a rock shaft 90 therebetween and provide a seal to prevent the escape of vulcanizing steam through the thus provided journal bearings. Affixed to the central portion of rock shaft 90 within the interior of boss 86 is a radial arm 94. A concave material-engaging roll 99 is journalled on a shaft 97 positioned transversely of arm 94 at the outer end thereof. Shaft 97 is supported at opposite ends thereof by ears 96 which are secured to an arm 94 by brackets 95. It will be apparent from FIG. 5 that the roller 99 rides upon the upper surface of material 14 passing therebelow, the angle of positioning of rock shaft 90 about its axis being determined by the height of the upper surface of the material 14 passing beneath the roller.

The means journalling and sealing rock shaft 90 at opposite ends thereof are similar except for the provision for the extension of the rock shaft through the sealing means in the bearing and sealing means at the right in FIG. 4. The left-hand journal bearing and sealing means includes an inwardly converging frusto conical seat 100 in boss 91, an annular sealing means 101 of complementary shape disposed within such seat, and a nut 102 in the form of a hood threadedly received within boss 91 and telescoped over the outer end of rock shaft 90. The annular sealing means 101 may be made, for example, of Teflon, such device being thrust firmly into seat 100 by the nut 102, thus to provide a seal between the shaft 90 and boss 91. Because of its low frictional properties, the Teflon sealing means 101, as well as the similar sealing means 105 to be described, functions as a low-friction bearing. Thus means 101 and 105 accurately journal rock shaft 90, but do not impose any undue restraint against the turning of such shaft.

Boss 92 is provided with a similar inwardly converging frusto-conical seat 104 within which there is disposed the above described further annular sealing means 105. Sealing means 105 is thrust strongly into seat 104 by a hollow elongated nut having a threaded sleeve portion 106 threadedly engaging the boss in boss 92. Nut 109 is retained in adjusted position by means of a lock nut 110.

As is apparent in FIG. 5, the radial arm 94 is capable of oscillation from a position in which roller 99 lies substantially at the bottom of the housing 84 to a position wherein the roll lies substantially above the horizontal passage through housing 84, as shown at 99″. The rock shaft 90 is suitably counterbalanced by a balance weight 112, which is adjustable longitudinally of a second outer radial arm 111 affixed to the rock shaft, so that roller 99 stably rests upon the upper surface of material 14. The turning of rock shaft 90 by the material 14 as such material rises and falls as it passes beneath roller 99 controls the speed of motor 74 of take-up capstan 21 in the following manner.

Turning now to FIG. 11, it will be seen that motor 74, which is of such construction that its speed under load varies with changes in the voltage applied thereto, is under the control of a rheostat 115 having a winding 116 and a rotatable contactor 117. Rheostat 115 is interposed in one line $L_1$ connected to motor 74, another line $L_2$ being connected to the other terminal of the motor. Lines $L_1$ and $L_2$ are connected to a suitable source of electric current, not shown. Contactor 117 is fixedly mounted upon a central shaft 119, and is rotated in synchronism with the rotation of rock shaft 90 through the medium of a chain or "timing belt" 122 entrained over a sprocket 121 fixed to shaft 119 and a sprocket 120 fixed to the rock shaft 90. Preferably, as shown sprocket 120 is of substantially greater diameter than sprocket 121, so that shaft 119 and contactor 117 move through an appreciably greater angle than does rock shaft 90 during the operative movements of the latter shaft.

Motor 74 is under the control of a solenoid operated switch 124, which permits the starting and stopping of the motor. Switch 124 has a first, movable contactor 126 which selectively bridges and connects spaced contacts 125 in line $L_1$, so that motor 74 is energized when contactor 126 is in its lower position, as shown, and the motor is deenergized when contactor 126 is raised. Contactor 126 is reciprocated vertically by a solenoid 127 and an upwardly thrusting coil compression spring 129, such solenoid being selectively energized from lines $L_1$ and $L_2$ by the closing of switch 130. When energized, solenoid 127 thrusts contactor 126 downwardly against the action of spring 129; when the solenoid is deenergized, the spring 129 thrusts the contactor 126 upwardly to open contacts 125, 125.

The apparatus of the invention is preferably provided with mechanism which automatically retracts the arm 94 and the roller 99 thereon to an upper, inoperative position when the material-forwarding mechanism of the apparatus is stopped, as during the stringing up of the apparatus. One such position is shown in phantom lines in FIG. 5 wherein the arm, there designated 94″, lies generally horizontal, and the roller, there designated 99″, lies above the main passage through conduit 57 and housing 84. Such retraction of the arm 94 and roller 99 automatically insures that the material being strung through the apparatus will not become fouled by the arm or roller. FIGS. 4, 5, and 11 illustrate a preferred mechanism for effecting such automatic retraction of the arm and roller.

A set of spaced lower contacts 131, 131 are disposed in a wire 134 which is connected as shown to line $L_1$. Another wire 135 is connected to line $L_2$. Wires 134 and 135 extend to be connected to a solenoid 136 which is connected to operate a valve 137. Valve 137 has an inlet port to which is connected a pipe 139 connected to a source of fluid under pressure, such as compressed air (not shown), an outlet port to which a pipe 140 is connected, and two alternatively opened delivery ports to which conduits 141 and 142 are connected. The valve 136, 137, which is conventional, is of such construction that when solenoid 136 is deenergized fluid under pressure is delivered to conduit 141, and that when solenoid 136 is energized fluid under pressure is delivered to conduit 142.

The contacts 131, 131 are part of switch 124; coacting with such contacts is a second, lower contactor 132 which is disposed beneath contacts 131, 131 and which is connected to the armature of solenoid 127 to move with contactor 126. When solenoid 127 is energized, as shown in FIG. 11, contactor 132 is spaced from contacts 131, 131, solenoid 136 is deenergized, and fluid under pressure is delivered to conduit 141.

Conduit 141 is connected to the lower end of a double-acting reciprocable fluid motor having a vertical cylinder 144, a piston 145 reciprocable therein, and a piston rod 146 connected to the piston to reciprocate therewith, the piston and rod thus being raised when solenoid 136 is deenergized. When solenoid 136 is energized, by the raising of contactor 132, fluid under pressure is admitted to the upper end of cylinder 144, thereby lowering piston 145 and piston rod 146.

Piston 145 and piston rod 146 are connected to rock shaft 90 in the manner shown in FIGS. 4 and 5. As there shown, a third radial arm 147 is connected to rock shaft 90 outwardly of arm 111, arm 147 having a longitudinally extending slot 149 therein. A fitting 150, which forms a vertically adjustable upper end piece on piston rod 146, extends freely through slot 149. A collar 151, mounted for vertical adjustment on fitting 150, overlies arm 147. The relationship of the parts is such that when piston 145 and rod 146 are raised, the collar 151 affixed to fitting 150 lies above arm 147 even when arm 94 and roller 99 lie in their lowermost positions. When the piston and rod are lowered, however, the fitting 150 and collar 151 descend, so that the collar 151 engages arm 147 and pulls it downwardly, thereby elevating arm 94 and roller 99 into their retracted, inoperative positions.

By way of illustration, there are given below the salient dimensions of a typical entering end portion of the vulcanizing chamber of a continuous vulcanizing system in accordance with the invention. It is to be understood that the present invention is not limited to the example, the invention being defined by the scope of the claims appended hereto.

In such illustrative apparatus the horizontal center line of the cross head of the extruder is positioned a distance of 20.09′ above the plane of the first horizontal zone 67. The projected horizontal length of the entering portion of the vulcanizing chamber from the center line of the extruder to the entering end of zone 67 is 71.355′. The axis of the die 43 in the extruder head, and thus the angle of approach of the unsheathed core 11 to the head with respect to the horizontals, shown at α in FIG. 1d is 28°. The total length of the splice box from the center line of the extruder head to the transverse center of the joint 56 is 9′11″. Tube 40 of the splice box has an inner diameter of 6″ whereas the connecting tube 52 has an inner diameter of 5″. Tube 52, as shown, is displaced upwardly with respect to tube 40, the sheathed elongated material 14 entering tube 52 from the extruder die generally axially of the tube and then sagging somewhat as it travels through the mid portion of the splice box. The sections 57′ and 57 of the curved remainder of the entering portion of the vulcanizing chamber have an internal diameter of 8″, the first or entering section of conduit 64′ at zone 67 having an internal diameter of 6″. The angle γ, which the upper end of tube section 57′ makes with the horizontal, is 27°.

The curved entering portion of the vulcanizing chamber may be made to approximate a catenary in shape by bending the upper end of such portion, extending from a joint 56 downwardly to the point blank in FIG. 1c so that it has a bending radius of 149′5″, and by bending the remaining curved portion of the chamber, extending from point blank to the zone 67, with a bending radius of 134′1″. The described entering portion of the vulcanizing chamber has such configuration that when the sheathed material 14 is maintained in substantially the solid line position thereof shown in FIG. 5, such sheathed material does not contact any solid structure, in fact any structure at all within the enclosure other than roller 99 from the point at which it issues from the extruding die 43 until it contacts the first horizontal section of the vulcanizing chamber at zone 67.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

Thus although the material position-detecting and controlling mechanism 61 has been described as controlling the motor 74 of the pull-out capstan 21, and the motor 31 of the hold-back capstan 13 has been described as being synchronized with the motor 28 which drives the extruder 12, a control system in accordance with the invention may be employed wherein the mechanism 61 controls the speed of motor 31 of hold-back capstan 13 and the motor 74 of pull-out capstan 21 is synchronized with the speed of motor 28.

Further, although the lockout mechanism for arm 94 and roller 99 of mechanism 61 has been shown and described as being responsive to the energization and deenergization of motor 74, it will be understood that such lockout mechanism may be made to be responsive to the operation of another mechanism or other mechanisms which are energized, for example, when the vulcanizing apparatus is operating and which are deenergized when the material 14 is not being traversed through the vulcanizing apparatus. Among such other mechanisms are the driving motor for the extruder, and the driving motors for the pay-off reel, the hold-back capstan, and the take-up reel.

What is claimed is:

1. In a continuous vulcanizing system having an elongated vulcanizing chamber through which elongated vulcanizable material travels, and means to subject the material in the vulcanizing chamber to vulcanizing heat, the improvement which comprises a vulcanizing chamber having an entering portion generally in the form of a half-catenary having its entering end raised above its exit end, the subsequent portion of the vulcanizing chamber having its lower inner surface merging smoothly with that of the exit end of the half-catenary, means for maintaining the elongated material under controlled tension in said entering portion of the vulcanizing chamber so as to hold the material in substantially catenary form free from substantial contact with the inner wall of the vulcanizing chamber from the entering end to the exit end of the said entering portion of the vulcanizing chamber, and means for detecting changes in the path of the material in the entering portion of the vulcanizing chamber and for controlling the means for maintaining the elongated material under tension.

2. A continuous vulcanizing system as claimed in claim 1, comprising an entrance seal at the entering end of the entering portion of the vulcanizing chamber, said entrance seal being tipped with respect to the horizontal so as to direct the material generally along the upper end of the catenary at the entering end of the entering portion.

3. A continuous vulcanizing system as claimed in claim 2, wherein the upper entering end of the entering portion of the vulcanizing chamber includes a straight splice box portion of substantial length interposed between the entrance seal and the remainder of the entrance portion which is of substantial catenary shape, the splice box portion having an internal diameter somewhat exceeding that of the said remainder of the entrance portion.

4. A continuous vulcanizing system as claimed in claim 3, wherein the angle which the center line of the seal makes with the horizontal substantially equals the angle which the center line of the straight splice box portion makes with the horizontal and the angle which the upper end of said remainder of the entering portion of the vulcanizing chamber makes with the horizontal.

5. A continuous vulcanizing system as claimed in claim 2, comprising a plastic material extruding device having an extruding head connected to the entrance end of the entering portion of the vulcanizing chamber, said extruding head including a die with which the extruded plastic material form said entrance seal.

6. A continuous vulcanizing system as claimed in claim 5, wherein the extruding head is connected to the entering portion of the vulcanizing chamber in advance of the straight splice box, and wherein the extruding head is tipped so that the angle which the center line of the die makes with the horizontal is substantially equal to the angle which the center line of the straight splice box portion makes with the horizontal and the angle which the upper end of said remainder of the entering portion of the vulcanizing chamber makes with the horizontal.

7. A continuous vulcanizing system as claimed in claim 6, wherein the center line of the extrusion die lies somewhat above the center line of the straight splice box section.

8. A continuous vulcanizing system as claimed in claim 1, wherein the means for detecting changes in the path of the material in the entering portion of the vulcanizing chamber comprises material-contacting means within the chamber, and comprising means to retract the material-contacting means from the path of the material.

9. A continuous vulcanizing system as claimed in claim 8, wherein the means to retract the material-contacting means from the path of the material is responsive to deenergization of the means for maintaining the material under controlled tension in the entering portion of the vulcanizing chamber.

10. In a generally horizontal continuous vulcanizing system having an elongated vulcanizing chamber through which elongated vulcanizable material travels, and means to subject the material in the vulcanizing chamber to vulcanizing heat, the improvement which comprises a vulcanizing chamber having an entering portion generally in the form of a half-catenary having its entering end raised above its exit end, the lower inner surface of the exit end of the entering portion lying generally horizontal, the subsequent portion of the vulcanizing chamber lying generally horizontal and having its lower inner surface merging smoothly with that of the exit end of the half-catenary, means for maintaining the elongated material under controlled tension in said entering portion of the vulcanizing chamber so as to hold the material in substantially catenary form free from substantial contact with the inner wall of the vulcanizing chamber from the entering end to the exit end of the said entering portion of the vulcanizing chamber, and means for detecting changes in the path of the material in the entering portion of the vulcanizing chamber and for controlling the means for maintaining the elongated material under tension.

11. A position-detecting device adapted to be employed in a continuous vulcanizing system having an elongated chamber containing a high temperature, high pressure fluid medium through which elongated vulcanizable material passes, said device comprising a housing having a material-receiving passage therethrough, the housing being adapted to be interposed between and sealed to sections of the chamber intermediate the length of the chamber, movable material-contacting means within the housing, means external of the housing connected to the last named means so as to move therewith, and pressure sealing means interposed between the said internal and external means.

12. A position-detecting device as claimed in claim 11, wherein the material-contacting means is mounted for movement generally transverse to the axis of the material-receiving passage through the housing, and comprises a rock shaft journalled in the housing, a generally radial arm secured to the rock shaft internally of the housing and mounting the material-contacting means thereon.

13. A position-detecting device as claimed in claim 12, wherein the rock shaft is sealed to the housing, the means journalling the rock shaft in the housing also forming the seal therefor.

14. A position-detecting device as claimed in claim 13, wherein the rock shaft-journalling and sealing means comprises a shaft-receiving bore through the housing, a tapered annular seat within the bore, an annular sealing member made of high temperature resistant plastic material having a low coefficient of friction disposed in the seat and around the rock shaft, and means forcibly to urge the annular sealing member into the seat.

15. A position-detecting device as claimed in claim 14, wherein the rock shaft extends across the housing and is journalled and sealed by generally similar means at both zones of penetration of the shaft into the housing, the shaft at at least one end being extended outwardly of the housing and connected to said means external of the housing.

References Cited in the file of this patent
UNITED STATES PATENTS

| | | |
|---|---|---|
| 2,119,570 | Brillhart | June 7, 1938 |
| 2,765,441 | Gambrill | Oct. 2, 1956 |
| 2,952,870 | Mark | Sept. 20, 1960 |
| 2,953,085 | Cook | Sept. 20, 1960 |